A. C. SCHUERMANN.
MEANS FOR ANCHORING NIPPLES.
APPLICATION FILED AUG. 5, 1913.
1,080,519.
Patented Dec. 2, 1913.
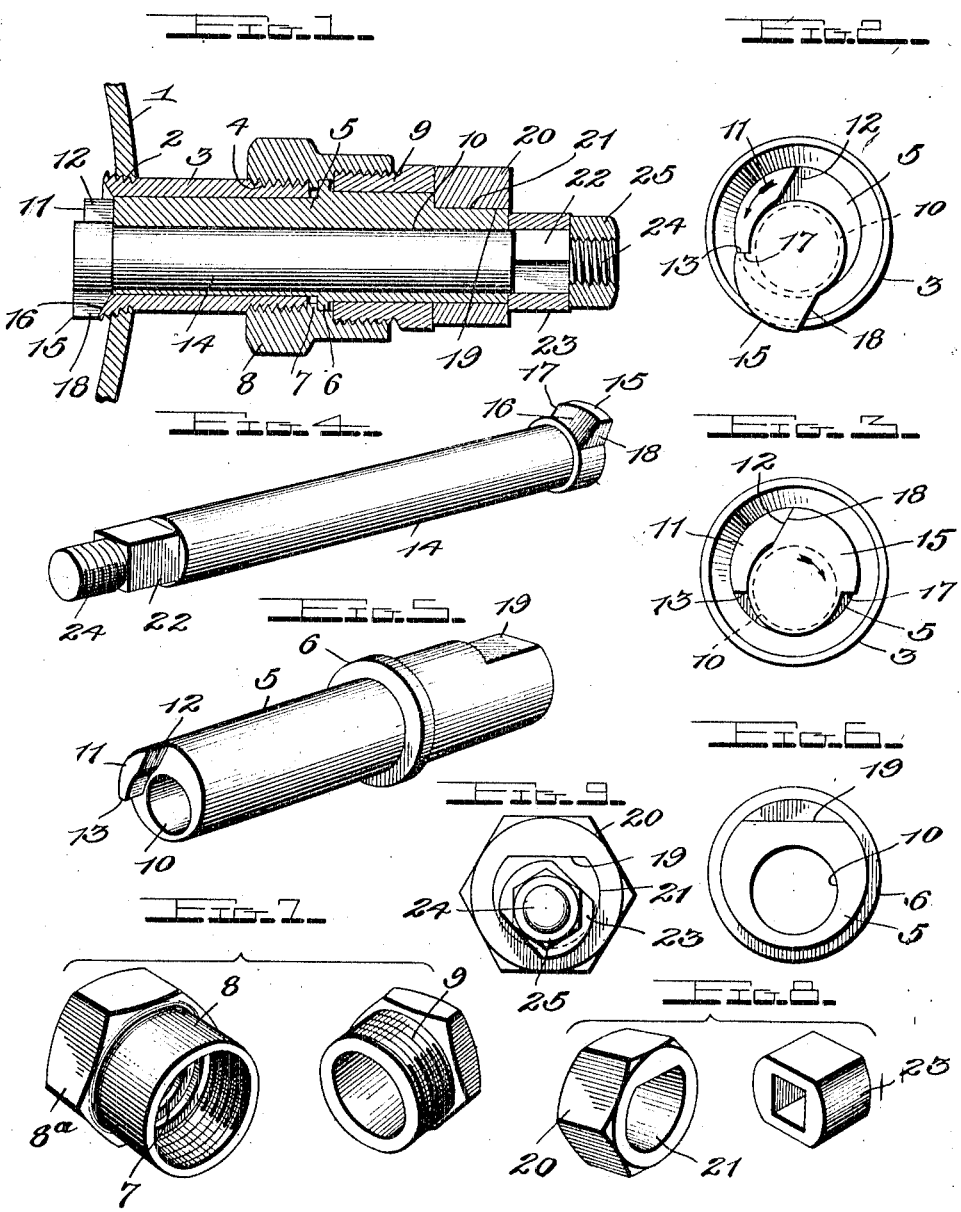
Inventor
Anton C. Schuermann,
Witnesses
By Meyers, Cushman & Rea
Attorneys

UNITED STATES PATENT OFFICE.

ANTON C. SCHUERMANN, OF DECATUR, ILLINOIS, ASSIGNOR TO H. MUELLER MFG. CO., OF DECATUR, ILLINOIS, A CORPORATION OF ILLINOIS.

MEANS FOR ANCHORING NIPPLES.

1,080,519.  Specification of Letters Patent.  Patented Dec. 2, 1913.

Application filed August 5, 1913. Serial No. 783,205.

*To all whom it may concern:*

Be it known that I, ANTON C. SCHUER-MANN, a citizen of the United States, residing at Decatur, in the county of Macon and State of Illinois, have invented new and useful Improvements in Means for Anchoring Nipples, of which the following is a specification.

This invention relates to improvements in means for anchoring a fitting in a pipe or the like.

The invention is designed chiefly to provide means for securely anchoring nipples in a pipe or other article, the wall of which is so thin that it does not afford sufficient mass for ordinary screw-threaded connection of the nipple therewith, but is not restricted to the anchoring of nipples, as it is useful in the attachment of cocks and various fittings to pipes, all of which are included in the following description under the generic term "fitting."

The invention consists in the means hereinafter described and claimed, reference being had to the accompanying drawing which shows the preferred embodiment of the invention, and in which:—

Figure 1 is a view, chiefly in longitudinal section, illustrating the nipple-end expanding-tool in side elevation, the end of the nipple being shown with its end expanded to anchor the nipple. Fig. 2 is an end view looking toward the expander end of the expanding tool, as arranged in Fig. 1, with the wall of the pipe omitted. Fig. 3 is a view similar to Fig. 2 showing the expanding tool rotated to a different position so that it may be passed, together with the sleeve in which it rotates, through the nipple either preparatory to or after completion of the anchoring operation. Fig. 4 is a perspective view of the expanding tool. Fig. 5 is a perspective view of the sleeve in which the expanding tool is arranged for rotation during operation. Fig. 6 is an end view of said sleeve. Fig. 7 shows, in perspective, nuts by which the expanding-tool carrying-sleeve is held in proper position in the nipple. Fig. 8 shows, in perspective, wrench grips to be fitted to the expanding-tool shank for operation of said tool. Fig. 9, an end view of the parts shown in Fig. 1, looking at the right-hand end of said figure.

In the drawing, the reference numeral 1 designates, as an example of one of the intended uses of the invention, a fragment of a thin-walled pipe, such as a calamine pipe, having a screw-threaded nipple-receiving opening 2.

3 designates a nipple which, as illustrated, has had its end, within the pipe, expanded for secure anchorage. This nipple is provided with screw-threads to engage those of the opening 2 of the pipe, and its end projects within the pipe, as shown. The opposite end of the nipple is screw-threaded, as shown at 4. The numeral 5 designates a sleeve which is insertible into and removable from the nipple, and which is designed to have a nice fit within the nipple. For the operation of anchoring the nipple, this sleeve is designed to be held in position in the nipple against endwise movement, with its end slightly within that end of the nipple which is to be expanded, and I have shown one suitable way for so positioning and holding the said sleeve, which consists in providing the same with an annular collar 6, that rests against an interior shoulder 7 with which a nut 8 adapted for engagement with the screw-threads 4 of the nipple is provided, and against which shoulder the said collar is clamped by means of the clamping nut 9. The sleeve 5 is provided with an expanding-tool-shank receiving-bore 10 which, as shown, is eccentric to the longitudinal axial line of the sleeve, as best shown in Figs. 5 and 6 of the drawing. The object of this eccentric arrangement of the bore is to enable the expanding-tool to be, together with said sleeve, inserted into and withdrawn from the nipple as will clearly appear hereinafter.

The sleeve 5 is provided with a pusher 11, one edge of which, 12, constitutes a stop or gage against which the working face 18 or the hereinafter-described expander head 15 comes to rest, as shown in Fig. 3, in which position the expanding-tool and the sleeve may be inserted in or withdrawn from the nipple. The opposite edge 13 of the pusher 11 constitutes an impeller. When the wall 17 of the expander-head is engaged therewith, as shown in Fig. 2, and the sleeve is rotated in the direction shown by the arrow in said Fig. 2, the impeller constitutes a link or coupling between the sleeve and the expander head, and causes the expander head of the expanding tool to rotate in unison with the rotation of the sleeve. This is the preferable arrangement, but it will be obvious that this rotation of the expanding-tool and its head in unison with the rotation of the sleeve, may be accomplished by an implement which would simultaneously engage the wrench grip 20 and the wrench grip 23, in which event the pusher 11 could be omitted. It is also obvious that the operation could be carried on by applying one wrench to the wrench grip 20 to hold the sleeve from rotation, and another wrench to the wrench grip 23 to rotate the expanding-tool within and independently of the sleeve.

The expanding-tool comprises a shank 14 which is insertible into, rotatable in, and withdrawable from the bore of the sleeve 5, and is provided with a laterally extending expander head 15, having two wedge faces, one of which, 16, is peripheral and inclined or oblique with relation to the axis of rotation of the tool, and the other, 18, of which is substantially tangential to the periphery of the expander-head.

Beyond the collar clamping-nut 9 angular formation is imparted to the sleeve 5, for example, as shown at 19, and a wrench-grip 20 corresponding in contour to the angular part of the sleeve 5, as best shown in Fig. 8, is removably arranged upon said angular portion. Manipulation of this wrench-grip will cause the sleeve to rotate, and, when the pusher 11 is in engagement with the expander-head of the expanding tool, as shown in Fig. 2, will cause said expander-head to revolve around the axis of rotation of the sleeve, and operate as hereinafter described.

As shown in Fig. 1, the shank of the expanding tool projects beyond the angular portion 19 of the sleeve, and adjacent this angular portion of the sleeve the said shank is in angular formation, as shown at 22, to receive a wrench grip 23 which is independent of the wrench grip 20, and may be slid onto and off of the angular portion 22. Manipulation of this wrench grip causes the expanding-tool to rotate within the sleeve upon its own axis, and thus project its peripheral wedge-face 16 beyond the outer circumference of the sleeve into expanding engagement with the end of the nipple. The extremity of the shank of the expanding tool opposite the expander head is screw-threaded, as at 24, and a binding-nut 25 is fitted thereupon and made to engage the wrench-grip 23, thus holding the latter, as well as the wrench-grip 20, in operative position, as shown in Fig. 1. The wrench-grip 23 also, as shown in Figs. 1 and 9 of the drawing, engages the end of the sleeve 5 and thus holds the sleeve with its collar 6 seated against the shoulder 7 of the nut 8. The said binding-nut not only serves to hold the wrench-grips 20 and 23 in operative position, but also holds the expander-head to its work of expanding the end of the nipple.

The mode of operation of the invention, and one suitable way of assembling the parts for such mode of operation, will be sufficient, together with the foregoing description of the several elements of the apparatus, to enable those skilled in the art to fully understand the invention. Assuming a nipple-receiving opening 2 has been tapped and screw-threaded in a pipe or the like; first, the expanding-tool may be fitted in the eccentric bore of the sleeve 5 with its tangential wedge-face 18 in contact with the stop-face 12 of the pusher 11, as shown in Fig. 3 of the drawing, so that the expander-head lies within the circuit of the interior of the wall of the nipple to be anchored. The sleeve may be then fitted into the nut 8, with its collar 6 resting against the shoulder 7 of the nut, and the confining nut 9 adjusted to position as shown in Fig. 1. Then the sleeve may be inserted into the nipple and the nut 8 made to engage the screw-threaded end 4 of the latter, after which the wrench grips 20 and 23 are slipped into place and the binding nut 25 is adjusted. The nipple, with the contained sleeve and expanding-tool, is then manually screwed into the opening 2 of the pipe as far as it may be conveniently done manually, and thereafter by means of a wrench or other suitable implement applied to the nut 8, which may be suitably fashioned for the engagement of such implement, as, for example, provided with wrench-grip faces $8^a$, as shown in Fig. 7, the nipple is screwed home in the opening 2. Of course, the sequence of steps of assembly of parts just stated is illustrative merely, and said parts may be otherwise assembled to assume the coöperative relation shown in Fig. 1 of the drawing. The parts are now in position to accomplish the expanding of the end of the nipple within the wall of the pipe. A wrench is applied to the wrench-grip 20 and firmly held to prevent rotation of said grip, and consequently of the sleeve 5, and at the same time the expanding tool is rotated upon its own axis in the direction indicated by the arrow in Fig. 3 by means of a wrench applied to the wrench-grip 23. This causes the peripheral wedge-face 16 of the expander-head to be projected into engagement with the wall of the end of the nipple and gradually and progressively expand the same until the edge 17 of the expander-head comes into engagement with the edge 13 of the pusher 11, which limits the rotative movement of the expanding-tool in this direction. It is obvious that further rotation thereof, if possible, would merely operate to retract the expander-head from the wall of the nipple. When the parts have assumed the last described position, which is illustrated in Fig. 2 of the drawing, the wrench is removed from the grip 23, and a wrench applied to the grip 20 is operated to rotate the sleeve 5 in the direction indicated by the arrow in Fig. 2, and, through the medium of the pusher element of the sleeve, the expanding-tool is caused to revolve around the axial line of rotation of the sleeve, advancing its rearwardly inclined or tangential wedge-face 18 to expand the end of the pipe. A few revolutions of the expander-head will be sufficient to complete the operation, after which the expander head may be reversely rotated through the medium of a wrench applied to the grip 23 until it comes to rest, as shown in Fig. 3, against the stop 12, after which the several elements of the apparatus may be disassembled, for example, by rotating the nut 8 until it is free of the screw-threads 4 of the nipple, whereupon all the parts, including the sleeve 5 and the expanding tool, may be withdrawn, leaving the nipple anchored in place.

Having thus described the invention what I claim is:—

1. In apparatus for anchoring fittings, a sleeve adapted to be arranged in the fitting and provided with an eccentric bore, an expanding-tool having a laterally projecting expander-head arranged in said bore, and means for rotating the expanding-tool to expand the end of the fitting.

2. In apparatus for anchoring fittings, a sleeve provided with an eccentric bore and a pusher, an expanding-tool rotatably arranged in said bore and having a laterally projecting expander-head for coöperation with said pusher, means for rotating said expanding-tool in said bore, and means for rotating said sleeve for causing the expander-head, through the medium of said pusher, to revolve about the axial line of rotation of said sleeve.

3. In apparatus for anchoring fittings, the combination of a sleeve-carrying nut provided with means for connection to a nipple, a sleeve rotatably arranged in said nut, adapted to be inserted into a nipple, and provided with an eccentric bore and a pusher, an expanding-tool rotatably arranged in said bore and provided with a laterally projecting expander-head for coöperation with said pusher, means for rotating said expanding-tool in said sleeve, and means for rotating said sleeve whereby the pusher thereof causes the expander-head to revolve about the axial line of rotation of the sleeve.

4. In apparatus for anchoring fittings, the combination of a sleeve-carrying nut provided with means for connection to a nipple, a sleeve rotatably arranged in and removable from said nut, adapted to be inserted into a nipple, and provided with an eccentric bore and a pusher, an expanding-tool rotatably arranged in said bore and provided with a laterally projecting expander-head for coöperation with said pusher, means for rotating said expanding-tool in said sleeve, and means for rotating said sleeve whereby the pusher thereof causes the expander-head to revolve about the axial line of rotation of the sleeve.

5. In apparatus for anchoring fittings, the combination with a sleeve-carrying nut provided with means for engagement with a nipple, a sleeve provided with an eccentric bore rotatably arranged in said nut and provided with a pusher, means for holding said sleeve in said nut, an expanding-tool rotatably arranged in the bore of the sleeve and provided with a laterally projecting expander-head for coöperation with said pusher, a wrench-grip mounted on said sleeve, a wrench-grip mounted on the shank of said expanding-tool, and means for maintaining said parts in an assembled operative condition.

6. In apparatus for anchoring fittings, a sleeve insertible into the nipple, means for maintaining the same in operative position in the nipple, an expanding-tool rotatably arranged in said sleeve and provided with a laterally projecting expander-head, means for maintaining said expanding-tool in operative position in said sleeve, means for rotating the expander-head, means for rotating said sleeve, and a pusher with which the sleeve is provided to engage and advance the pusher head, causing it to revolve about the axial line of rotation of the sleeve.

7. In apparatus for expanding fittings, the combination with a sleeve provided with an eccentric bore and insertible into a nipple, an expanding-tool rotatably arranged in said bore and provided with a laterally projecting expander-head having peripheral and tangential wedge faces, means for maintaining said sleeve and expanding-tool in operative position in the nipple, means for rotating said expanding-tool, means for rotating said sleeve, and a pusher with which the sleeve is provided for coöperation with the expander-head to cause the latter to revolve about the axial line of rotation of the sleeve.

In testimony whereof I have hereunto set my hand in presence of two subscribing witnesses.

ANTON C. SCHUERMANN.

Witnesses:
LEONARD F. McKIBBEN,
CATHERINE E. McKEOWN.